United States Patent
Song et al.

(10) Patent No.: US 9,358,808 B1
(45) Date of Patent: Jun. 7, 2016

(54) METHOD FOR CONTROLLING LASER MARKING MACHINE AND LASER MARKING MACHINE

(71) Applicant: Maxphotonics Co., Ltd., Shenzhen (CN)

(72) Inventors: Jun Song, Shenzhen (CN); Gaofeng He, Shenzhen (CN); Feng Jiang, Shenzhen (CN)

(73) Assignee: Maxphotonics Co., Ltd., Shenzhen (CN)

( * ) Notice: Subject to any disclaimer, the term of this patent is extended or adjusted under 35 U.S.C. 154(b) by 0 days.

(21) Appl. No.: 14/621,397

(22) Filed: Feb. 13, 2015

(30) Foreign Application Priority Data

Nov. 28, 2014 (CN) .......................... 2014 1 0712091

(51) Int. Cl.
*B41J 2/47* (2006.01)
(52) U.S. Cl.
CPC ........................................ *B41J 2/47* (2013.01)
(58) Field of Classification Search
CPC .......................................................... B41J 2/47
See application file for complete search history.

(56) References Cited

U.S. PATENT DOCUMENTS

| 2005/0108502 | A1 | 5/2005 | Sandstrom |
| 2007/0100492 | A1 | 5/2007 | Idaka et al. |
| 2011/0045835 | A1 | 2/2011 | Chou et al. |
| 2012/0293642 | A1 | 11/2012 | Berini et al. |

FOREIGN PATENT DOCUMENTS

| CN | 101017424 A | 8/2007 | |
| CN | 101104239 A | 1/2008 | |
| CN | 102381060 A | 3/2012 | |
| CN | 103072383 A | 5/2013 | |
| DE | 201111101091 | * 1/2011 | .............. H01M 4/04 |

* cited by examiner

*Primary Examiner* — Sarah Al Hashimi
(74) *Attorney, Agent, or Firm* — Gokalp Bayramoglu (57) ABSTRACT

The present invention discloses a method for controlling a laser marking machine and a laser marking machine. The laser marking machine includes an interface module, a processing module, a laser control module and a galvanometer control module. The interface module receives marking data packets and transfers the marking data packets to the processing module. The processing module parses the marking data packets to obtain marking instructions and control parameters, extracts laser control instruction(s) and galvanometer control instruction(s) from the marking instructions, extracts laser control parameter(s) and galvanometer control parameter(s) from the control parameters, transfers the laser control instruction(s) and the laser control parameter(s) to the laser control module, and transfers the galvanometer control instruction(s) and the galvanometer control parameter(s) to the galvanometer control module.

18 Claims, 5 Drawing Sheets

METHOD FOR CONTROLLING LASER MARKING MACHINE AND LASER MARKING MACHINE

TECHNICAL FIELD

The present invention relates to the field of laser printing technologies, and in particular, to a method for controlling a laser marking machine and a laser marking machine.

BACKGROUND ART

Figure 1:
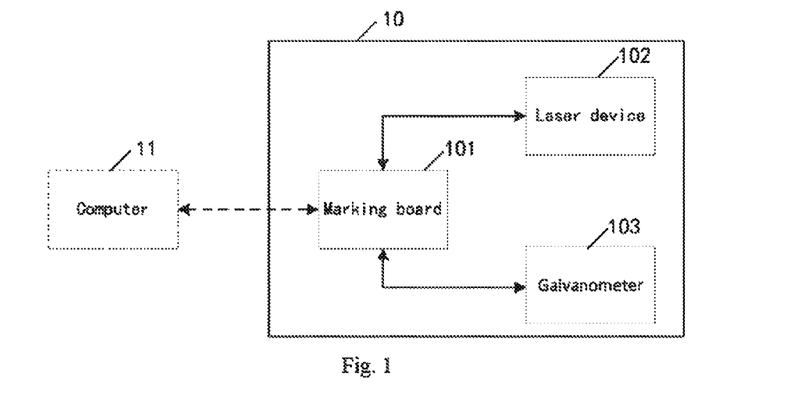
FIG. 1 is a schenmatic structural diagram of a laser marking machine in the prior art.

A laser marking machine refers to a machine which is used to stamp a permanent mark on a surface of various material by laser beam. As shown in FIG. 1, a laser marking machine 10 in the prior art includes a marking board 101, a laser device 102 and a galvanometer 103.

The marking board 101 communicates with a computer 11 through a USB interface, and the marking board 101 communicates with the laser device 102 through 25-pin TTL level. The operating principle of the laser marking machine is as follows: the computer 11 transfers marking instructions to the marking board 101 through the USB interface; the marking instructions are buffered by the marking board 101; the marking process starts after the buffering; the marking board 101 reads the buffered marking instructions one by one, so as to control the switch of the laser device and the movement of the galvanometer to perform the marking process. The laser marking machine in the prior art has following disadvantages. Firstly. since the marking board 101 communicates with the laser device 102 through 25-pin TTL level, the marking board is required to use db25 interface level fluctuation to control the laser device, and marking information needs to be converted to a db25 high-low level signal; the laser device detects the db25 high-low level signal and then the high-low level signal is parsed to the marking information, so as to control the switch, power and frequency of the laser; and this may induce some calculation errors and cause unstable transmission due to interference. Secondly, the marking board and laser device are independent of each other, and controlling is performed only by the db25 high-low level signal, so that the controlling of the marking board 101 to the laser device 102 is relatively rough. Thirdly, this structure may result in a relative large volume of the laser marking machine, which may directly cause a waste of resource and an increased consumption.

SUMMARY OF THE INVENTION

The main technical problem to be solved in the present invention is to provide a method for controlling a laser marking machine and a laser marking machine. The solution of the present invention is able to directly transfer laser control instruction(s) and laser control parameter(s) to a laser control module, and directly transfer galvanometer control instruction(s) and galvanometer control parameter(s) to a galvanometer control module, without encoding and decoding the laser control instruction(s), the laser control parameter(s), the galvanometer control instruction(s) and the galvanometer control parameter(s), which is very convenient.

To solve the above technical problem, a solution of the present invention is as follows:

A laser marking machine, wherein the laser marking machine includes an interface module, a processing module, a laser control module and a galvanometer control module; wherein, the interface module is configured to receive marking data packets and transfer the marking data packets to the processing module:

the processing module is configured to parse the marking data packets to obtain marking instructions and control parameters, extract laser control instruction(s) and galvanometer control instruction(s) from the marking instructions, extract laser control parameter(s) and galvanometer control parameter(s) from the control parameters, transfer the laser control instruction(s) and the laser control parameter(s) to the laser control module, and transfer the galvanometer control instruction(s) and the galvanometer control parameter(s) to the galvanometer control module; and the laser control module is configured to control the marking of a laser device according to the laser control instruction(s) and the laser control parameter(s), and the galvanometer control module is configured to control the movement of a galvanometer according to the galvanometer control instruction(s) and the galvanometer control parameter(s).

Optionally, the processing module includes a parsing unit and a main control unit: wherein, the parsing unit is configured to parse the marking data packets to obtain the marking instructions and the control parameters; and the main control unit is configured to extract the marking instructions, extract control parameters and execute processing to obtain the laser control instruction(s), the galvanometer control instruction(s), the laser control parameter(s) and the galvanometer control parameter(s), and to transfer the laser control instruction(s) and the laser control parameter(s) to the laser control module and transfer the galvanometer control instruction(s) and the galvanometer control parameter(s) to the galvanometer control module.

Optionally, the processing module further includes a storing unit and an instruction registering unit; wherein, the storing unit is configured to store the marking instructions; and the instruction registering unit is configured to store the control parameters.

Optionally, the instruction registering unit further includes a start registering sub-unit; and the main control unit is configured to transfer a read instruction when it is detected that a start tag of starting marking is stored in the start registering sub-unit.

Optionally, the processing module further includes a read unit and a buffer unit; wherein, the read unit is configured to read the marking instructions from the storing unit according to the read instruction and store the marking instructions in the buffer unit; and the main control unit is configured to read the marking instructions from the buffer unit.

Optionally, the buffer unit is configured to buffer at least 500 instructions, so as to keep the main control unit not in vacancy.

Optionally, the galvanometer control parameters include a movement velocity and a movement direction of the galvanometer; and the galvanometer control instructions include a target coordinate value of the movement of the galvanometer.

Optionally, the galvanometer control module is particularly configured to, obtain a current coordinate value where the galvanometer is currently positioned, calculate a movement distance of the galvanometer according to the current coordinate value and a target coordinate value, and calculate a move time of each step according to the movement distance and the movement velocity.

Optionally, it is judged whether the move time of each step is more than a preset time step size;

if the move time of each step is more than the preset time step size, then a medium coordinate value is calculated according to the current coordinate value, the preset time step size, the movement velocity and the movement direction, and the medium coordinate value is transferred to the galvanometer; and a difference obtained by subtracting the preset time step size from the move distance is used as a new move time of each step, the medium coordinate value is used as a current coordinate value, and it is repeated to judge whether the move time of each step is more than the preset time step size, if the move time of each step is more than the preset time step size, then the medium coordinate value be calculated and transferred to the galvanometer.

Optionally, it is judged whether the move time of each step is less than or equal to the preset time step size; and if the move time of each step is less than or equal to the preset time step size, the galvanometer control module is also configured to directly transfer the target coordinate value to the galvanometer.

Optionally, the laser control instructions includes activation of the laser and termination of the laser, and the laser control parameters includes delay time of activating the laser, delay time of terminating the laser, frequency of the laser and power of the laser.

Another solution of the present invention is as follows:

A method for controlling a laser marking machine, wherein the method includes:

receiving marking data packets;

parsing the marking data packet to obtain marking instructions and control parameters;

executing according to the marking instructions and the control parameters, to obtain laser control instruction(s) and galvanometer control instruction(s) from the marking instructions, and to obtain laser control parameter(s) and galvanometer control parameter(s) from the control parameters;

transferring the laser control instruction(s) and the laser control parameter(s) to the laser control module, and transferring the galvanometer control instruction(s) and the galvanometer control parameter(s) to the galvanometer control module; and the laser control module controlling the marking of a laser device according to the laser control instruction(s) and the laser control parameter(s), and the galvanometer control module controlling the movement of the galvanometer according to the galvanometer control instruction(s) and the galvanometer control parameter(s).

Optionally, after the step of parsing the marking data packet to obtain marking instructions and control parameters, the method further inches:

storing the marking instructions and the control parameters in a storing unit and an instruction registering unit respectively.

Optionally, the method further includes:

storing a start tag of starting marking in a start registering sub-unit of the instruction registering unit.

Optionally, the method further includes:

detecting whether the start tag of the starting marking is stored in the start registering sub-unit; and if the start tag of the starting marking is stored in the start registering sub-unit, then reading the marking instructions from the storing unit and storing the marking instructions in a buffer unit.

Optionally, the method further includes:

reading the marking instructions from the buffer unit, and proceeding to the step of executing according to the marking instructions and the control parameters.

Optionally, the galvanometer control parameters include a movement velocity of the galvanometer, and the galvanometer control instructions include a target coordinate value of the movement of the galvanometer.

Optionally, the step of the galvanometer control module controlling the movement of the galvanometer according to the galvanometer control instructions and the galvanometer control parameters in particular includes:

obtaining a current coordinate value where the galvanometer is currently positioned, calculating a movement distance of the galvanometer according to the current coordinate value and a target coordinate value, and calculate a move time of each step according to the movement distance and the movement velocity.

Optionally, judging whether the move time of each step is more than a preset time step size;

if the move time of each step is more than the preset time step size, then calculating a medium coordinate value according to the current coordinate value, the preset time step size and the movement direction, and transferring the medium coordinate to the galvanometer; and using a difference obtained by subtracting the preset time step size from the move time of each step as a new move time of each step, using the medium coordinate value as a current coordinate value, and repeating to judge whether the move time of each step is more than the preset time step size, if the move time of each step is more than the preset time step size, then calculating the medium coordinate value and transferring the medium coordinate value to the galvanometer.

Optionally, the method further includes:

judging whether the move time of each step is less than or equal to the preset time step size; and if the move time of each step is less than or equal to the preset time step size, the galvanometer control module directly transferring the target coordinate value to the galvanometer.

Optionally, the laser control instructions includes activation of the laser and termination of the laser, and the laser control parameters includes delay time of activating the laser, delay time of terminating the laser, frequency of the laser and power of the laser.

The advantageous effects of the present invention are as follows: distinguishing from the prior art, the solution of the present invention may parse the received marking data packets to obtain the marking instructions and the control parameters, and execute according to the marking instructions and the control parameters to obtain the laser control instruction(s), the galvanometer control instruction(s), the laser control parameter(s) and the galvanometer control parameter(s); wherein, the laser control instruction(s) and the laser control parameter(s) may be directly transferred to the laser control module, and the galvanometer control instruction(s) and the galvanometer control parameter(s) may be directly transferred to the galvanometer control module; and the laser control module may directly use the received laser control instruction(s) and the laser control parameter(s), and the galvanometer control module may also directly use the received galvanometer control instruction(s) and the galvanometer control parameter(s), without encoding and decoding the laser control instruction(s), the galvanometer control instruction(s), the laser control parameter(s) and the galvanometer control parameter(s) during the transmission of the data, which is very convenient.

BRIEF DESCRIPTION OF THE DRAWINGS

The drawing figures depict preferred embodiments by way of example, not by way of limitation. In the figures, like reference numerals refer to the same or similar elements.

DETAILED DESCRIPTION OF THE EMBODIMENTS

It will be understood that, although the teens first, second. etc. can be used herein to describe various elements, these elements should not be limited by these terms. These terms are used to distinguish one element from another, but not to imply a required sequence of elements. For example, a first element can be termed a second element, and similarly, a second element can be termed a first element, without departing from the scope of the present invention. As used herein, the term "and/or" includes any and all combinations of one or more of the associated listed items.

The present invention will be described in detail in connection with the drawings and the embodiments hereinafter.

Figure 2:
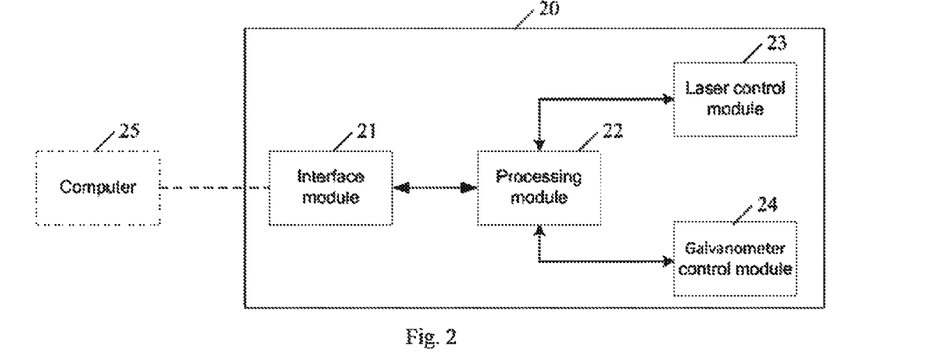
FIG. 2 is a schematic diagram showing a logical structure of a laser marking machine according to a first embodiment of the present invention.

With reference to FIG. 2, a laser marking machine 20 may include an interface module 21, a processing module 22, a laser control module 23 and a galvanometer control module 24.

The interface module 21 may receive marking data packets and transfer the marking data packets to the processing module 22. In the embodiment of the present invention, the interface module 21 is a USB interface which is connected to a computer 25, and the computer 25 may transfer the marking data packets to the laser marking machine 20 via the USB interface. Of course, in an alternative embodiment, the interface module 21 may be other standard communication interfaces such as serial port, network port and the like. Wherein, the marking data packets are packed by the computer 25 according to patterns to be marked.

The processing module 22 may parse the marking data packets to obtain marking instructions and control parameters. The marking instructions are instructions used to control operations of the laser device and the galvanometer, and the control parameters are parameters used to control operations of the laser device and the galvanometer. The processing module 22 may extract laser control instruction(s) and galvanometer control instruction(s) from the marking instructions, extract laser control parameter(s) and galvanometer control parameter(s) from the control parameters; and then may transfer the laser control instruction(s) and the laser control parameter(s) to the laser control module 23, and transfer the galvanometer control instruction(s) and the galvanometer control parameter(s) to the galvanometer control module 24. The laser control module 23 may control the marking of a laser device according to the laser control instruction(s) and the laser control parameter(s), and the galvanometer control module 24 may control the movement of a galvanometer according to the galvanometer control instruction(s) and the galvanometer control parameter(s). The laser control instructions may include activation of the laser and termination of the laser, and the laser control parameters may include delay time of activating the laser, delay time of terminating the laser, frequency of the laser and power of the laser. The galvanometer control instructions may include a coordinate value of the movement of the galvanometer, and the galvanometer control parameters may include a velocity of the movement of the galvanometer.

Figure 3:
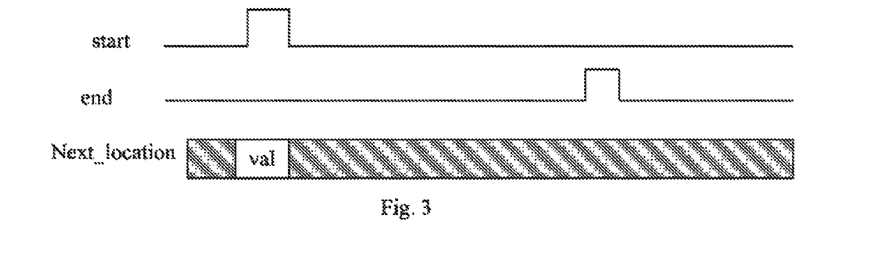
FIG. 3 is a schenmatic diagram of an input signal of the laser marking machine according to the first embodiment of the present invention.
Figure 4:
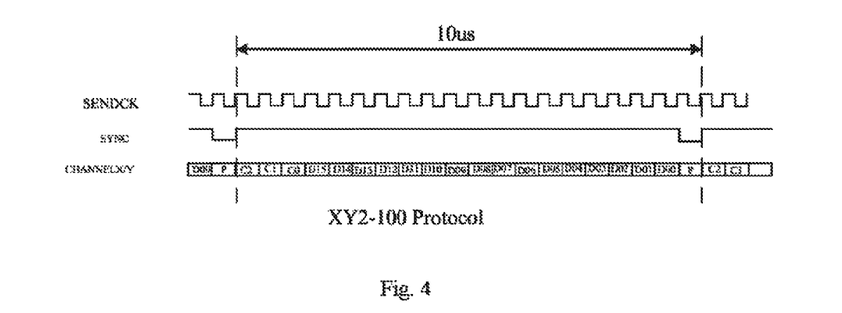
FIG. 4 is a schematic diagram of an output signal of the laser marking machine according to the first embodiment of the present invention.

The laser device may realize the movement of a light spot on X-Y coordinate by controlling the movement of the galvanometer, so as to realize the movement on marked plane at arbitrary positions. The galvanometer control instructions may include a target coordinate value of the movement of the galvanometer, which is a terminal (a coordinate value of position) of the movement of the galvanometer and refers to a terminal of the movement of the galvanometer requested by a current instruction. In high level, the processing module 22 may transfer a coordinate value VAL of next position to the galvanometer control module 24. After arriving at the VAL position, the galvanometer returns an end pulse to the processing module 22. Usually, the galvanometer has its own control protocol and may not arrive at the position of the target coordinate value at one time. The control protocol of the galvanometer is XY2-100 protocol, including a preset time step size, for example, 10 us for one step, which means a position value is sent to the galvanometer every 10 us, an input signal shown in FIG. 3, and an output signal shown in FIG. 4. That is to say, the position information from the processing module 22 may be transferred to the galvanometer in a form that could be recognized by the galvanometer. In particular, the galvanometer control module 24 is configured to obtain a current coordinate value where the galvanometer is currently positioned, calculate a movement distance of the galvanometer according to the current coordinate value and a target coordinate value, and calculate a move time of each step according to the movement distance and the movement velocity. It is judged whether the move time of each step is more than a preset time step size; if the move time of each step is more than the preset time step size, then a medium coordinate value could be calculated according to the current coordinate value, the preset time step size, the movement velocity and the movement direction, and the medium coordinate value is transferred to the galvanometer, such that the galvanometer is moved to the position of the medium coordinate value. A difference obtained by subtracting the preset time step size from the move time of each step is used as a new move time of each step, and the medium coordinate value is used as the current coordinate value. It is repeated to the step of judging whether the move time of each step is more than the preset time step size, if the move time of each step is more than the preset time step size, then the medium coordinate value being calculated and transferred to the galvanometer. When it is determined that the move time of each step is less than or equal to the preset time step size, the galvanometer control module is also configured to directly transfer the target coordinate value to the galvanometer.

In order to better understand the control manner of the galvanometer control module 24, the description will be given by way of taking the preset time step size of 10 us as an example hereinafter. The move time of each step of the galvanometer is 10 us, and the galvanometer moves at a preset movement velocity. Accordingly, a displacement for each step is a step. In the case that the VAL value is not exactly divisible by the step, a fine interpolation processing is required at last step. For example, if the remainder displacement of the galvanometer is more than 1 step but less than 1.5 steps, the remainder displacement will be completed in one step; if the remainder displacement is more than 1.5 steps but less than 2 steps, it will be completed in two steps. As such, the fine interpolation processing is necessarily made in the case of not exact division. The principle of the fine interpolation processing may not change the movement velocity of the galvanometer and not result in a great change in displacement at last step.

Figure 5:
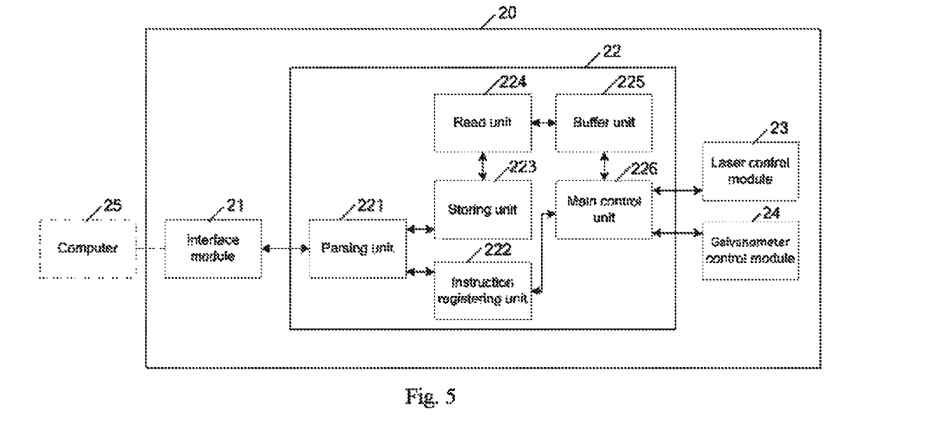
FIG. 5 is a schematic diagram showing a detailed structure of a processing module of the laser marking machine according to the first embodiment of the present invention.

Further, with reference to FIG. 5, the processing module 22 may include a parsing unit 221, an instruction registering unit 222, a storing unit 223 and a main control unit 226.

Figure 6:
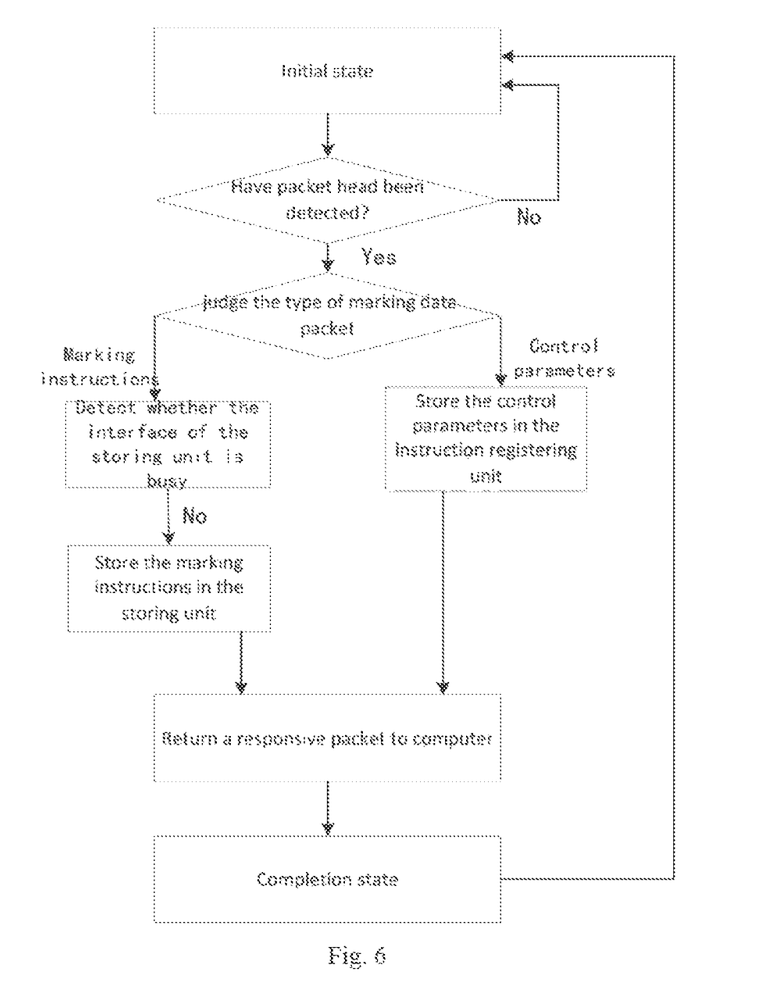
FIG. 6 is a schenmatic diagram showing the state procedure of a state machine of a parsing unit of the laser marking machine according to the first embodiment of the present invention.

The parsing unit 221 may parse the marking data packets to obtain the marking instructions and the control parameters, and store the marking instructions and the control parameters in the storing unit 223 and the instruction registering unit 222 respectively. Further, once the parsing unit 221 receives a set of information, it may return a set of information to the computer 25. The responsive exchange manner may guarantee the accuracy of data during transmission. The entire procedure of parsing may be completed using a state machine. As shown in FIG. 6, the states of the state machine include initial state→detecting packet head→judging packet type→storing marking instructions in storing unit and storing control parameter in instruction registering unit→returning responsive packet to computer→completion state. It should be explained that, FIG. 6 only shows a state change of writing data to the laser marking machine by the computer 25, and a reversed reading process which is similar to the writing process is provided. The reading process includes: judging whether to read image information or control information firstly, then transferring a read instruction to the storing unit and the instruction registering unit, and the data after being read back being transferred to the computer 25 in the form of responsive packets. As it could be seen from the above, the parsing unit 221 has two functions, which are parsing and transferring of the data packets.

The main control unit 226 may extract the marking instructions from the storing unit 223, extract control parameters from the instruction registering unit 222, and then execute processing to obtain the laser control instruction(s), the galvanometer control instruction(s), the laser control parameter(s) and the galvanometer control parameter(s), and transfer the laser control instruction(s) and the laser control parameter(s) to the laser control module 23 and transfer the galvanometer control instruction(s) and the galvanometer control parameter(s) to the galvanometer control module 24. In particular, the main control unit 226 may primarily be configured to control the states of the laser marking machine according to the control parameter(s) in the instruction registering unit 222 (for example, start, pause, times of marking and the like), and to transfer the delay parameter(s), the velocity parameter(s) and the like in the instruction registering unit 222 to the laser control module 23 and the galvanometer control module 24.

In order to facilitate controlling the main control unit 226 to start and terminate marking, the instruction registering unit 222 may further include a start registering sub-unit (not shown in figure). When it is requested to start marking, the computer 25 may write a start tag of starting marking in the start registering sub-unit; when it is requested to terminate marking, the computer 25 may write a termination tag of terminating marking in the start registering sub-unit. The main control unit 226 may detect the start registering sub-unit itinerantly. When the start tag is detected, the main control unit 226 may read the marking instructions and the control parameters to execute; when the termination tag is detected, the main control unit 226 may terminated the execution. Herein, the start tag may be designated by high level as "1", and the termination tag may be designated by low level as "0".

Figure 7:
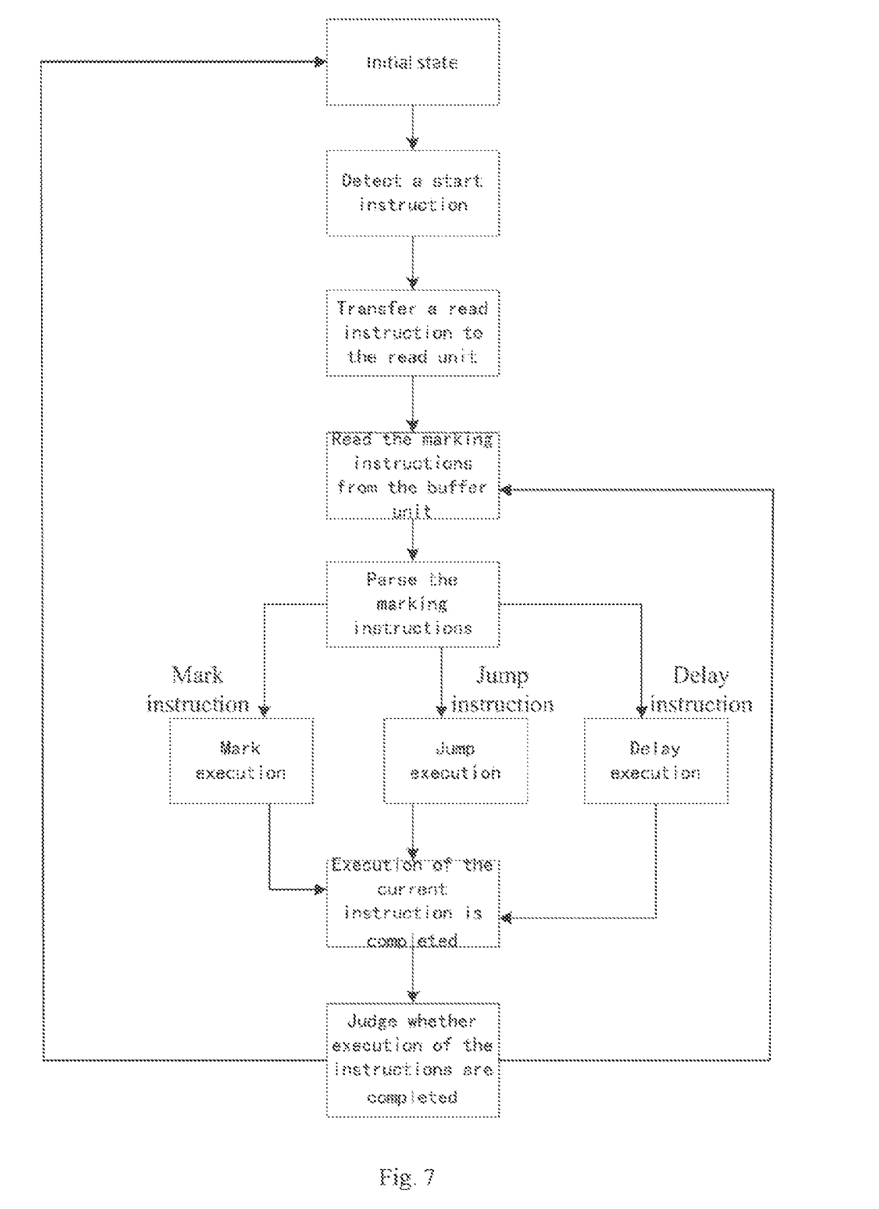
FIG. 7 is a schematic diagram showing an executive procedure of a main control unit of the laser marking machine according to the first embodiment of the present invention.

In order to increase the speed at which the main control unit 226 reads the marking instructions, the marking instructions may also be buffered in a buffer unit. The main control unit 226 may extract the marking instructions from the buffer unit. Thus, the processing module 22 may further include a read unit 224 and a buffer unit 225. When it is detected that the start tag is stored in the start registering sub-unit, the main control unit 226 may transfer a read instruction to the read unit 224, and the read unit 224 may read the marking instructions from the storing unit 223 according to the read instruction and store the marking instructions in the buffer unit 225. The main control unit 226 may read the marking instructions from the buffer unit 225. The writer of the buffer unit 225 is the read unit 224, and the reader of the content of the buffer unit 225 is the main control unit 226. The write-in speed is much higher that the read-out speed. Since the marking instructions are buffered by the buffer unit 225, the read-out speed and the write-in speed of the main control unit 226 can be increased. Herein, the size of the buffer unit 225 is configurable. In the embodiment of the present invention, the buffer unit 225 may be configured to buffer 500 instructions, so as to keep the main control unit 226 always not in vacancy. After the data in the storing unit 223 are all read out, one instruction execution of the main control unit 226 is followed by one instruction reduction from the buffer unit 225, until the buffer unit 225 is all read out. At this time, the read unit 224 may transfer an "empty" signal to the main control unit 226, and the main control unit 226 may determine that all the instructions are completely executed (the marking is completed). The execution processes of the main control unit 226 are shown in FIG. 7.

The data may be directly transmitted through data transmission without being encoded, which is convenient and prompt. In addition, the parsing unit 221 and the read unit 224 in the FPGA are realized in the form of hardware, so that they may operate much more efficiently than those in the form of software.

In order to better understand the present invention, the implementation principle of the present invention will be described in detail below.

At first step of transferring information, the computer 25 packages an image to be marked and transfers it to the interface module 21, the interface module 21 transfers all information from the computer 25 to the parsing unit 221; after receiving the information, the parsing unit 221 filters the information; if the information is a marking instructions, then it may be written in the storing unit 223 to buffer; and if the information is control parameters (such as, the power of marking, the speed of marking, and the like), the control parameters may be written in the instruction registering unit 222 according to the protocol. After all information is completely written in, the first step of transferring information is finished. At second step of starting marking, the computer 25 writes a start command of starting marking into the instruction registering unit 222; once the main control unit 226 detects the start command, it may request the read unit to read the marking instructions from the storing unit 223 and buffer the marking instructions in the instruction registering unit 225 which is able to buffer 500 instructions so as to keep the main control unit 226 not in vacancy; the main control unit 226 reads the marking instructions from the instruction registering unit 225 and parses the marking instructions; and according to the parsed information, the main control unit 226 transfers the switch and delay time information for controlling the laser to the laser control module 23 and transfers a next coordinate point of the galvanometer to the galvanometer control module 24. The laser control module 23 may control the switch of the laser device according to the received information, and the galvanometer control module 24 may determine a movement position of the galvanometer for each step according to the received parameters until the target coordinate point is reached. After all the instructions in the storing unit 223 are completely executed, the buffer space between the main control unit 226 and the instruction registering unit 225 is empty. Thus, the marking is finished, and the second step is terminated. In the embodiment of the present invention, the instruction registering unit 222 may be a register, and a plurality of registers may be provided.

In comparison with the laser marking machine in the prior art, the present invention has at least following advantages. Firstly, the laser marking machine in the prior art is divided into a marking board and a laser device, both of which are combined to control the switch of laser; the marking board converts the control signal to a db25 high-low level signal: the laser device detects the db25 high-low level signal and parse the detected signal to obtain a signal for control the laser; and the whole process is a process of encode-transit-decode, and the calculation of encoding and decoding may possibly induce errors. In contrast, the laser marking machine in the present invention transfers the laser control parameters completely through the instruction registering unit and the storing unit, whereby omitting the process of encode-transit-decode and omitting the db25 interface. Therefore, the first advantage is properly improved. Secondly, the laser marking machine in the present invention integrates the marking board and the laser device; and the laser marking machine in the present invention has a high integration from inside control logic to outside structural arrangement, whereby saving space and lowering consumption. Thirdly, based on the above first and second points, the marking logic may control the laser more flexibly and easily. Since the control of the laser is not based on the simple db25 but depends on the instruction registering unit and the storing unit, the control is more appropriate and exact.

In the embodiment of the present invention, the parsing module may parse the received marking data packets to obtain the marking instructions and the control parameters; the main control unit may execute according to the marking instructions and the control parameters to obtain the laser control instruction(s), the galvanometer control instruction(s), the laser control parameter(s) and the galvanometer control parameter(s); wherein, the main control unit may directly transfer the laser control instruction(s) and the laser control parameter(s) to the laser control module and transfer the galvanometer control instruction(s) and the galvanometer control parameter(s) to the galvanometer control module; and the laser control module may directly use the received laser control instruction(s) and laser control parameter(s) upon the receipt, and similarly, the galvanometer control module may also directly use the received galvanometer control instruction(s) and galvanometer control parameter(s) upon the receipt, without encoding and decoding the laser control instruction(s), the galvanometer control instruction(s), the laser control parameter(s) and the galvanometer control parameter(s) during the transmission of the data, which is very convenient.

In addition, the present invention also provides a laser output device, which includes the interface module, the processing module, the laser control module and the galvanometer control module of the above embodiments, wherein, the interface module is further configured to convert USB protocol and level signals between the computer and a FPGA; and the processing module, the laser control module and the galvanometer control module are all programs of the FPGA.

The present invention also provides an implementation of a method for controlling a laser marking machine. Please refer to FIG. 8.

Figure 8:
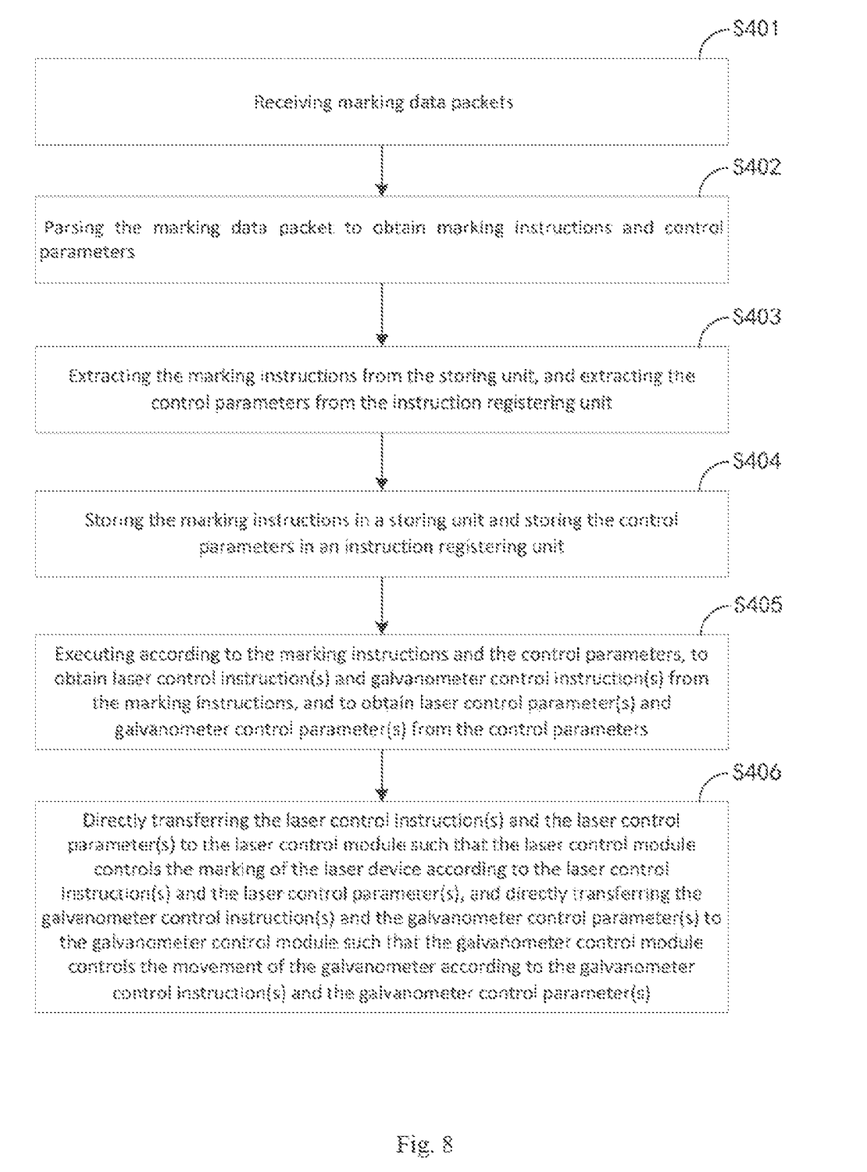
FIG. 8 is a flow chat showing an implementation of a method for controlling a laser marking machine according to the present invention.

Step S401, receiving marking data packets.

The marking data packets may be transferred by a computer. The computer may package a pattern to be marked to the marking data packets, and transfer the marking data packets to the laser marking machine.

Step S402, parsing the marking data packet to obtain marking instructions and control parameters.

A laser device used for laser marking may be arranged on a galvanometer, and marking positions of the laser device may be moved by the galvanometer. The marking instructions usually include three actions, which include activating the laser device, terminating the laser device and moving the marking positions of the laser device. The control parameters may be used to indicate laser power for the laser marking, laser frequency for the laser marking, delay time of activating the laser, delay time of terminating the laser and target coordinate of the movement of the galvanometer, and the like. In particular, the laser control instructions may include activation of the laser and termination of the laser, and the laser control parameters may include delay time of activating the laser, delay time of terminating the laser, frequency of the laser and power of the laser. The galvanometer control instructions may include a coordinate value of the movement of the galvanometer, and the galvanometer control parameters may include velocity of the movement of the galvanometer.

Further, a start registering sub-unit may be provided. The start registering sub-unit may be configured to store a start tag of starting marking and a termination tag of terminating marking. When it is requested to start marking, the computer may write the start tag in the start registering sub-unit; when it is requested to terminate marking. the computer may write the termination tag in the start registering sub-unit. The main control unit may detect the start registering sub-unit. When the start tag is detected, the marking instructions and the control parameters may be read to execute.

Step S405, executing according to the marking instructions and the control parameters, to obtain laser control instruction(s) and galvanometer control instruction(s) from the marking instructions, and to obtain laser control parameter(s) and galvanometer control parameter(s) from the control parameters.

The laser control instructions may include activation of the laser and termination of the laser; the laser control parameters may include delay time of activating the laser, delay time of terminating the laser, power of the laser and frequency of the laser; the galvanometer control instructions may include the movement of the galvanometer; and the galvanometer control parameters may include the coordinate of the movement.

Step S406, directly transferring the laser control instruction(s) and the laser control parameter(s) to the laser control module, such that the laser control module controls the marking of the laser device according to the laser control instruction(s) and the laser control parameter(s); and directly transferring the galvanometer control instruction(s) and the galvanometer control parameter(s) to the galvanometer control module, such that the galvanometer control module controls the movement of the galvanometer according to the galvanometer control instruction(s) and the galvanometer control parameter(s).

The laser control instruction(s) and the laser control parameter(s) are directly transferred to the laser control module, without transferring the laser control instruction(s) and the laser control parameter(s) after encoding. Similarly, the galvanometer control instruction(s) and the galvanometer control parameter(s) are directly transferred to the galvanometer control module, without transferring the galvanometer control instruction(s) and the galvanometer control parameter(s) after encoding. Since it is not necessary to transfer the galvanometer control instruction(s), the galvanometer control parameter(s), the laser control instruction(s) and the laser control parameter(s) after encoding, the solution of the present invention may not induce calculation errors and may not result in unstable transmission.

Further, after parsing the marking data packets to obtain the marking instructions and the control parameters, t the marking instructions and the control parameters may be further buffered, and starting marking after the marking data packets are completely transferred (that is, after the marking instructions and the control parameters are completely buffered). Of course, in an alternative embodiment, it is possible to start marking while buffering the marking instructions and the control parameters. Between the Step S401 and the Step S405, there may be included steps of:

Step S403, storing the marking instructions in a storing unit and storing the control parameters in an instruction registering unit.

The instruction registering unit may be a register, and a plurality of registers may be provided such that the control parameters could be stored in different registers according the protocol.

Step S404, extracting the marking instructions from the storing unit, and extracting the control parameters from the instruction registering unit.

After starting marking, the instruction registering unit, the read unit 224 may read instructions from the storing unit 223. One marking instruction extraction from the storing unit is followed by one marking instruction reduction from the storing unit. After the marking instructions in the buffer unit 225 are all extracted, it means the completion of marking.

In the embodiment of the present invention, the received marking data packets are parsed to obtain the marking instructions and the control parameters, and execute according to the marking instructions and the control parameters to obtain the laser control instruction(s), the galvanometer control instruction(s), the laser control parameter(s) and the galvanometer control parameter(s); wherein, the laser control instruction(s) and the laser control parameter(s) may be directly transferred to the laser control module, and the galvanometer control instruction(s) and the galvanometer control parameter(s) may be directly transferred to the galvanometer control module; and the laser control module may directly use the received laser control instruction(s) and the laser control parameter(s), and the galvanometer control module may also directly use the received galvanometer control instruction(s) and the galvanometer control parameter(s), without encoding and decoding the laser control instruction(s), the galvanometer control instruction(s), the laser control parameter(s) and the galvanometer control parameter(s) during the transmission of the data, which is very convenient.

Embodiment of each component of the present invention can be implemented by hardware, or realized by software modules running on one or more processors, or realized by the combination thereof. A person skilled in the art should understand that a microprocessor or a digital signal processor (DSP) may be used in practical use to realize some or all the functions of some or all the members of laser marking machine according to the embodiments of the present invention. The present invention may be further realized as some or all the equipment or device programs for executing the methods described herein (for example, computer programs and computer program products). This program for realizing the present invention may be stored in computer readable medium, or have one or more signal forms. These signals may be downloaded from the Internet website, or be provided by carrying signals, or be provided in any other manners.

Further, those skilled in the art should understand that the solutions of the present invention can also be used in other laser output device, such as a laser cutting machine, not limited to the laser marking machine. Moreover, unless otherwise definitely stated, each of features disclosed in the description (including claims, abstract and accompanying figures) may be replaced with alternative feature providing same, equivalent or similar purpose.

Described above is merely the embodiments of the present invention, which does not intend to limit the scope of the present invention thereto. Any equivalent structures or equivalent flows made by the contents in the specification and the accompanying drawings of the present invention, or direct or indirect applications in other relevant technical field, are all included in the protection scope of the present invention in the same way.

The invention claimed is:

1. A laser marking machine, wherein the laser marking machine includes an interface module, a processing module, a laser control module and a galvanometer control module; wherein,
the interface module is configured to receive marking data packets and transfer the marking data packets to the processing module;
the processing module is configured to parse the marking data packets to obtain marking instructions and control parameters, extract laser control instruction(s) and galvanometer control instruction(s) from the marking instructions, extract laser control parameter(s) and galvanometer control parameter(s) from the control parameters, transfer the laser control instruction(s) and the laser control parameter(s) to the laser control module, and transfer the galvanometer control instruction(s) and the galvanometer control parameter(s) to the galvanometer control module; and
the laser control module is configured to control the marking of a laser device according to the laser control instruction(s) and the laser control parameter(s), and the galvanometer control module is configured to control the movement of a galvanometer according to the galvanometer control instruction(s) and the galvanometer control parameter(s);
the galvanometer control parameters include a movement velocity and a movement direction of the galvanometer; and
the galvanometer control instructions include a target coordinate value of the movement of the galvanometer.

2. The laser marking machine according to claim 1, wherein the processing module includes a parsing unit and a main control unit; wherein, the parsing unit is configured to parse the marking data packets to obtain the marking instructions and the control parameters; and the main control unit is configured to extract the marking instructions, extract control parameters and execute processing to obtain the laser control instruction(s), the galvanometer control instruction(s), the laser control parameter(s) and the galvanometer control parameter(s), and to transfer the laser control instruction(s) and the laser control parameter(s) to the laser control module and transfer the galvanometer control instruction(s) and the galvanometer control parameter(s) to the galvanometer control module.

3. The laser marking machine according to claim 2, wherein the processing module further includes a storing unit and an instruction registering unit; wherein, the storing unit is configured to store the marking instructions; and the instruction registering unit is configured to store the control parameters.

4. The laser marking machine according to claim 3, wherein, the instruction registering unit further includes a start registering sub-unit; and the main control unit is configured to transfer a read instruction when it is detected that a start tag of starting marking is stored in the start registering sub-unit.

5. The laser marking machine according to claim 4, wherein, the processing module further includes a read unit and a buffer unit; wherein, the read unit is configured to read the marking instructions from the storing unit according to the read instruction and store the marking instructions in the buffer unit; and the main control unit is configured to read the marking instructions from the buffer unit.

6. The laser marking machine according to claim 5, wherein, the buffer unit is configured to buffer at least 500 instructions, so as to keep the main control unit not in vacancy.

7. The laser marking machine according to claim 1, wherein, the galvanometer control module is particularly configured to, obtain a current coordinate value where the galvanometer is currently positioned, calculate a movement distance of the galvanometer according to the current coordinate value and a target coordinate value.

8. The laser marking machine according to claim 7, wherein, it is judged whether the movement distance is more than the product of a preset step size and a first parameter;

if the movement distance is more than the product of the preset step size and the first parameter, then a medium coordinate value is calculated according to the current coordinate value, the preset step size and the movement direction, and the medium coordinate value is transferred to the galvanometer; and a difference obtained by subtracting the preset step size from the movement distance is used as a new movement distance, the medium coordinate value is used as a current coordinate value, and it is repeated to judge whether the movement distance is more than the product of the preset step size and the first parameter, if the movement distance is more than the product of the preset step size and the first parameter, then the medium coordinate value be calculated and transferred to the galvanometer.

9. The laser marking machine according to claim 7, wherein, it is judged whether the movement distance is less than or equal to the product of the preset step size and the first parameter; and if the movement distance is less than or equal to the product of the preset step size and the first parameter, the galvanometer control module is also configured to directly transfer the target coordinate value to the galvanometer.

10. A method for controlling a laser marking machine, wherein the method includes:

receiving marking data packets;

parsing the marking data packet to obtain marking instructions and control parameters;

executing according to the marking instructions and the control parameters, to obtain laser control instruction(s) and galvanometer control instruction(s) from the marking instructions, and to obtain laser control parameter(s) and galvanometer control parameter(s) from the control parameters;

transferring the laser control instruction(s) and the laser control parameter(s) to the laser control module, and transferring the galvanometer control instruction(s) and the galvanometer control parameter(s) to the galvanometer control module; and wherein the laser control module controlling the marking of a laser device according to the laser control instruction(s) and the laser control parameter(s), and the galvanometer control module controlling the movement of the galvanometer according to the galvanometer control instruction(s) and the galvanometer control parameter(s);

the galvanometer control parameters include a movement velocity and a movement direction of the galvanometer; and the galvanometer control instructions include a target coordinate value of the movement of the galvanometer.

11. The method according to claim 10, wherein, after the step of parsing the marking data packet to obtain marking instructions and control parameters, the method further includes:

storing the marking instructions and the control parameters in a storing unit and an instruction registering unit respectively.

12. The method according to claim 11, wherein the method further includes:

storing a start tag of starting marking in a start registering sub-unit of the instruction registering unit.

13. The method according to claim 12, wherein the method further includes:

detecting whether the start tag of the starting marking is stored in the start registering sub-unit; and if the start tag of the starting marking is stored in the start registering sub-unit, then reading the marking instructions from the storing unit and storing the marking instructions in a buffer unit.

14. The method according to claim 13, wherein the method further includes:

reading the marking instructions from the buffer unit, and proceeding to the step of executing according to the marking instructions and the control parameters.

15. The method according to claim 10, wherein, the step of the galvanometer control module controlling the movement of the galvanometer according to the galvanometer control instructions and the galvanometer control parameters particularly includes:

obtaining a current coordinate value where the galvanometer is currently positioned, calculating a movement distance of the galvanometer according to the current coordinate value and a target coordinate value.

16. The method according to claim 15, wherein, judging whether the movement distance is more than the product of a preset step size and a first parameter;

if the movement distance is more than the product of the preset step size and the first parameter, then calculating a medium coordinate value according to the current coordinate value, the preset step size and the movement direction, and transferring the medium coordinate to the galvanometer; and using a difference obtained by subtracting the preset step size from the movement distance as a new movement distance, using the medium coordinate value as a current coordinate value, and repeating to judge whether the movement distance is more than the product of the preset step size and the first parameter, if the movement distance is more than the product of the preset step size and the first parameter, then calculating the medium coordinate value and transferring the medium coordinate value to the galvanometer.

17. The method according to claim 15, wherein the method further includes:

judging whether the movement distance is less than or equal to the product of the preset step size and the first parameter; and if the movement distance is less than or equal to the product of the preset step size and the first parameter, the galvanometer control module directly transferring the target coordinate value to the galvanometer.

18. A laser output device, including the interface module, the processing module, the laser control module and the galvanometer control module according to claim 1, wherein, the interface module is further configured to convert USB protocol and level signals between a computer and a FPGA; and the processing module, the laser control module and the galvanometer control module are all programs of the FPGA.

* * * * *